United States Patent [19]

Montalvo, III

[11] Patent Number: 5,326,113
[45] Date of Patent: Jul. 5, 1994

[54] SINGLE ACTING CORE CHUCK

[76] Inventor: William W. Montalvo, III, Box 263P Egypt Rd., Raymond, Me. 04071

[21] Appl. No.: 931,961

[22] Filed: Aug. 19, 1992

[51] Int. Cl.⁵ .......................................... B23B 31/40
[52] U.S. Cl. ................................ 279/2.09; 269/48.1;
 279/2.16; 279/2.24; 242/572; 242/576.1;
 242/600
[58] Field of Search ................ 279/2.09, 2.1, 2.16,
 279/2.24, 2.01, 2.06, 2.18, 4.01; 242/68.1, 68.2,
 72 R; 269/48.1

[56] References Cited

U.S. PATENT DOCUMENTS

| | | | |
|---|---|---|---|
| 1,337,017 | 4/1920 | Kenworthy | 242/72 R |
| 2,733,072 | 1/1956 | Hohwart et al. | 279/4.01 |
| 3,030,903 | 4/1962 | Morris | 269/48.1 |
| 4,391,451 | 7/1983 | Secor et al. | 279/2.09 |

Primary Examiner—Steven C. Bishop
Attorney, Agent, or Firm—Brooks Haidt Haffner & Delahunty

[57] ABSTRACT

The pneumatically actuated core chuck described and shown has a compression ram movable with respect to a sleeve to force jaws to expand outwardly for engagement of the interior of a core of web material. The jaws are pivotally mounted by means of links extending from the compression ram. The ram is mounted on a piston movable in a cylinder for actuation by the introduction of air under pressure into a chamber behind the piston.

11 Claims, 5 Drawing Sheets

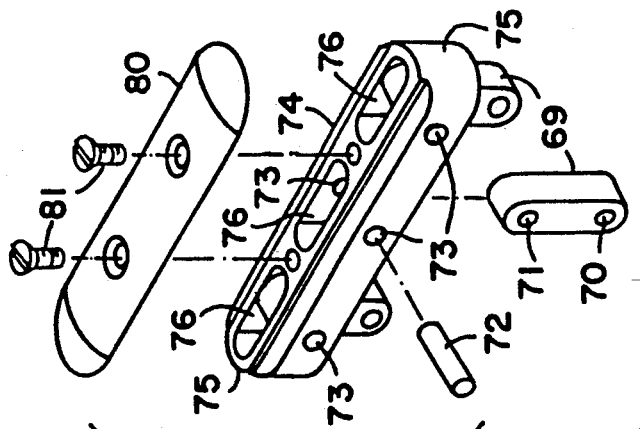
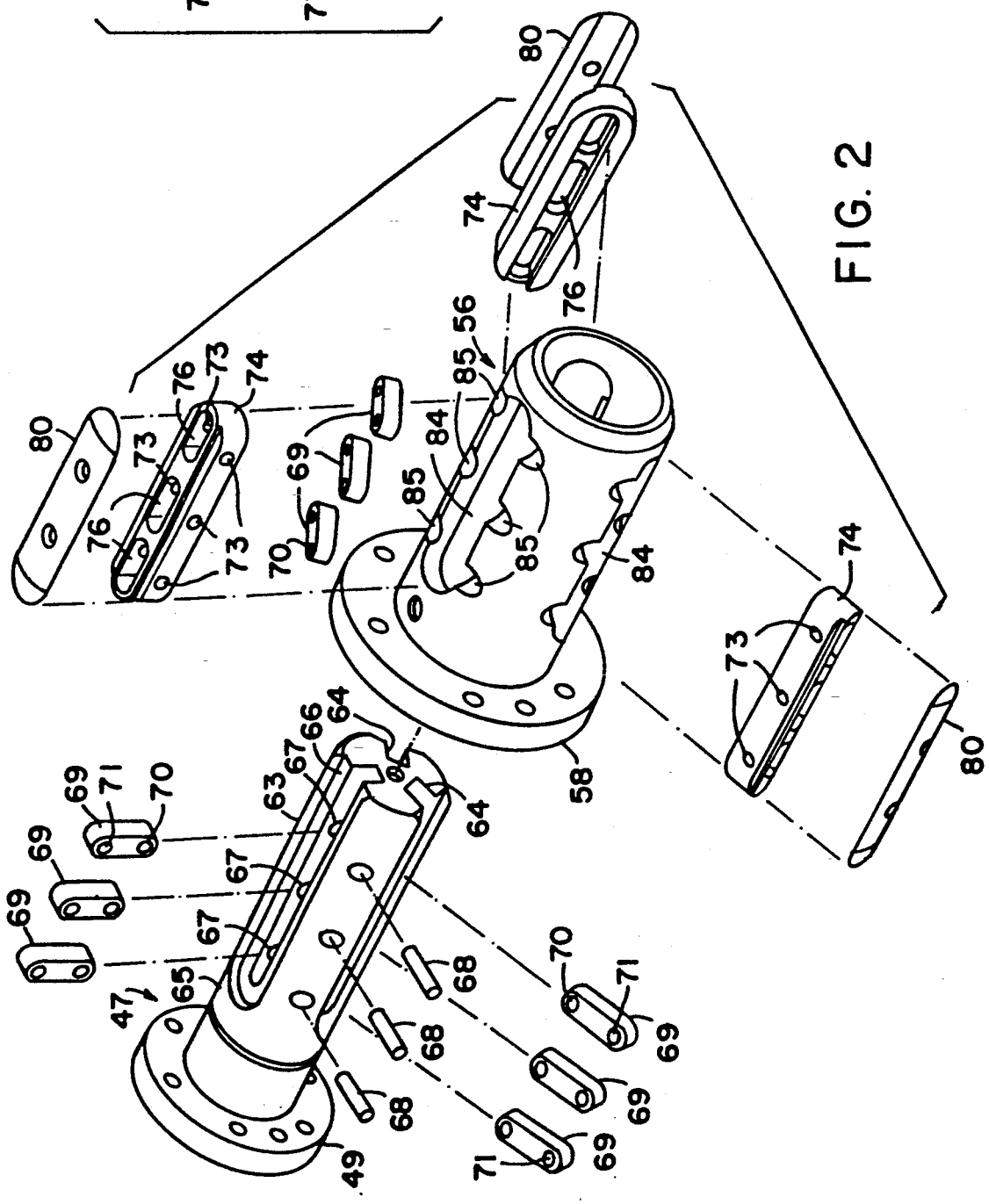
FIG. 3
FIG. 2

SINGLE ACTING CORE CHUCK

BACKGROUND OF THE INVENTION

1. Field of the Invention

The invention relates to pneumatically or hydraulically actuated expanding chucks for supporting cores of web material during winding.

2. Description of Related Art

In order to reduce the time required for loading and unloading of winding and unwinding apparatus for rolls of web material such as paper, film, foil, textiles and the like, stub shafts or chucks have been provided for insertion into the ends of roll cores. The chuck is made to fit the inside diameter of the roll core and is expansible to grip the core.

Various mechanisms have been employed in expanding mechanical chucks. For example, U.S. Pat. No. 3,584,714 shows a core plug which acts by squeezing of elastomeric material in response to torque applied to the core. This solution is not effective for dealing with high torque conditions. U.S. Pat. No. 4,391,451 relates to an air-actuated chuck in which a tapered arbor pushes apart a plurality of wedges for engagement with the interior of a core. Such an arrangement can be subject to jamming.

SUMMARY OF THE INVENTION

The air-actuated expanding chuck of the present invention has a compression ram mounted for movement in the direction of the axis of a core. One or more, and preferably three, links connect the compression ram to outwardly movable jaws for engagement with the interior of a core upon axial advancement of the compression ram. The outer end of the ram is mounted on a cylindrical piston plate which moves as a piston to advance the compression ram upon introduction of air under pressure into a chamber behind the piston plate. Springs are provided to push the piston plate outwardly upon relief of the air pressure, retracting the compression ram and, through the links, withdrawing the jaws from engagement with the core. Although the invention is described as embodied in a pneumatically actuated chuck, it should be understood that the chuck can also be hydraulically actuated.

The presently preferred embodiment of the invention includes three jaws, each connected by three pivotally mounted links to the compression ram. The jaws are equally arcuately spaced around the compression ram at 120° angles with respect to each other. Each jaw includes a base jaw and a core jaw mounted on the base jaw. The links are mounted at each of their ends on dowel pins. The number of jaws and/or links for each jaw could be different, if desired, for some applications.

The piston plate upon which the compression ram is mounted is movable within a cylinder which has a face plate and a back plate. The chamber for air or other fluid under pressure consists of a space between the piston plate and the base plate.

The base plate is mounted for rotating movement on a shaft, by conventional means, and conventional means are provided for axial movement of the entire chuck assembly when the jaws are in a disengaged condition so that a core can be removed.

The expansible core chuck of the invention is compact, quickly engaged and disengaged, and not subject to jamming. Other features and advantages of the core chuck of the invention will be more fully understood from the following detailed description of a preferred embodiment, especially when that description is read with reference to the accompanying figures of drawing.

BRIEF DESCRIPTION OF THE DRAWINGS

In the drawings, in which like reference numerals designate like parts:

FIG. 2 is an exploded view showing the compression ram assembly according to the invention.

FIG. 3 is an exploded view illustrating the assembly of a jaw in detail.

DESCRIPTION OF THE PREFERRED EMBODIMENT

Figure 1:
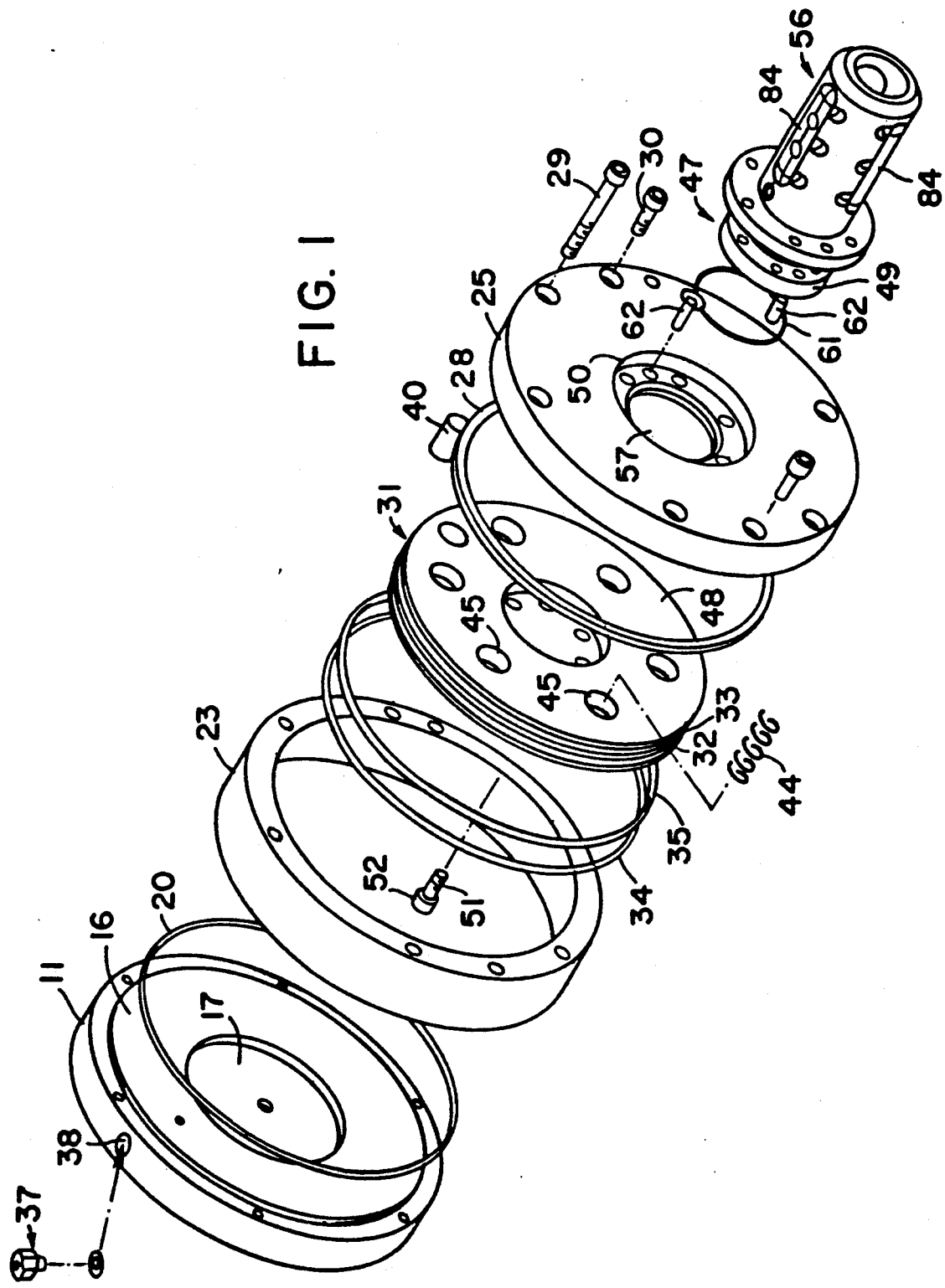
FIG. 1 is an isometric exploded view of the core chuck of the invention with parts omitted for simplicity.
Figure 4:
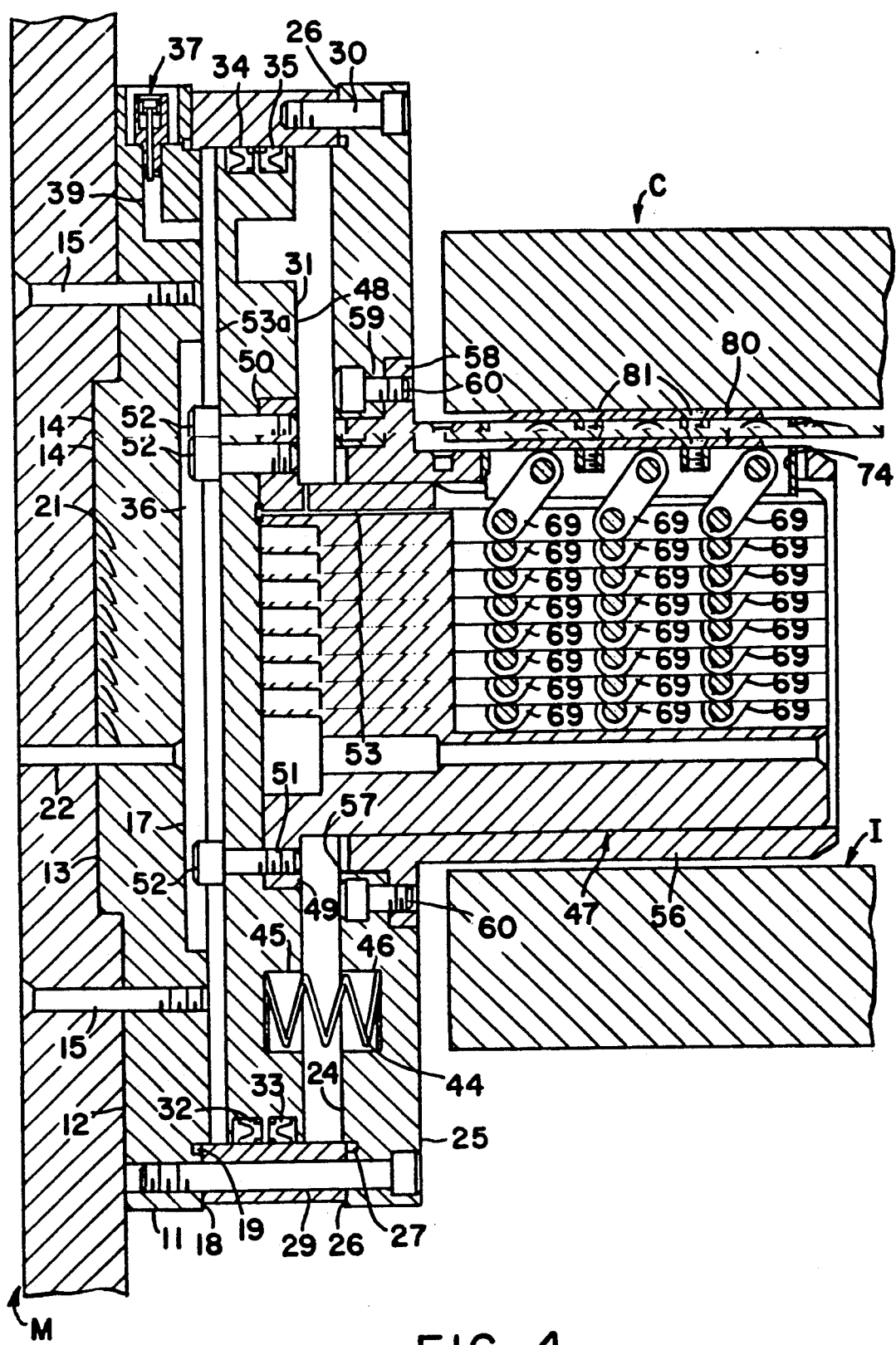
FIG. 4 is a view in cross section showing the chuck in its engaged condition.
Figure 5:
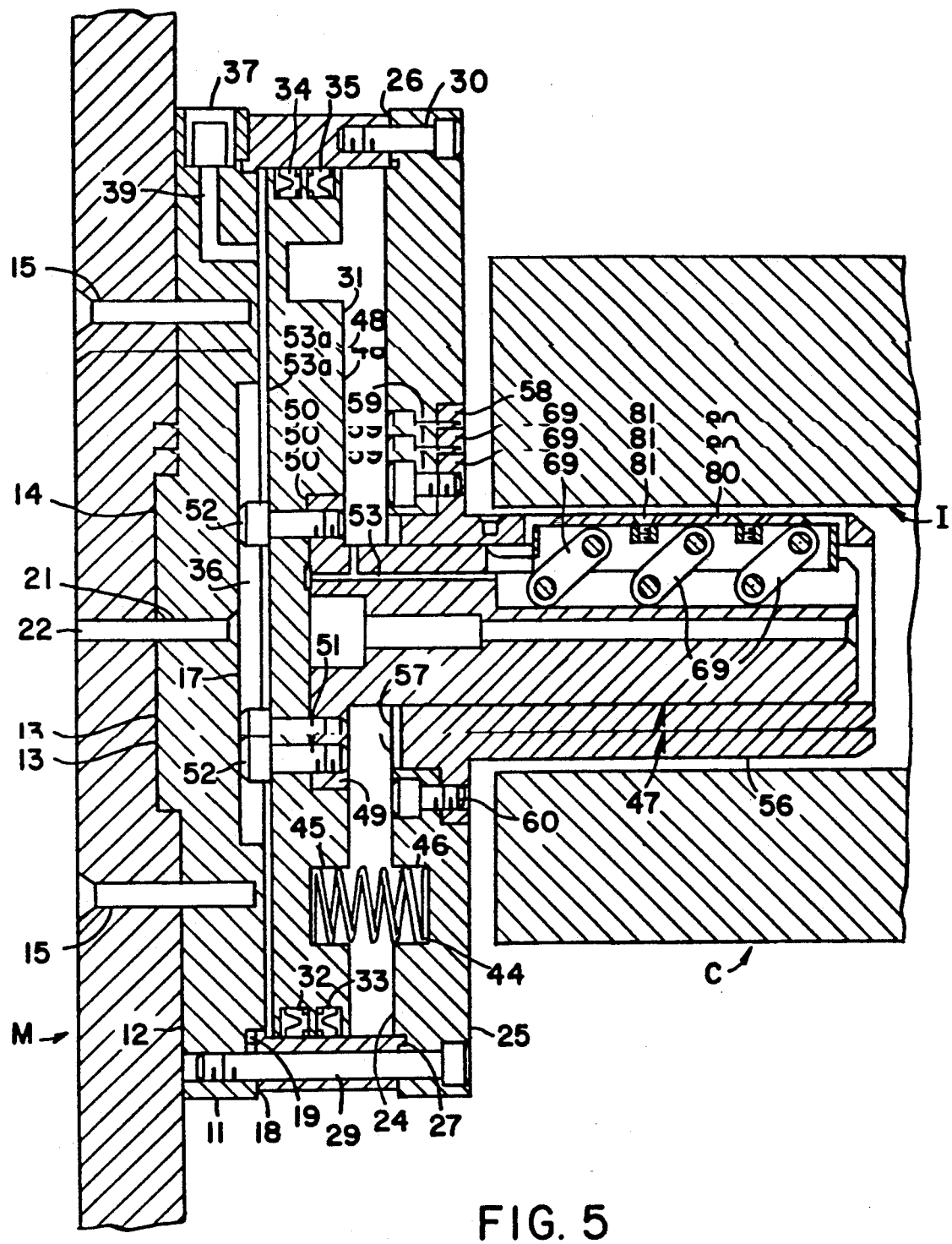
FIG. 5 is a view similar to that of FIG. 4 with the chuck disengaged from the core.

FIG. 1 shows the interrelationship of the component parts of the pneumatically actuated core chuck of the invention and FIGS. 4 and 5 illustrate how the core chuck has radially expansible members for placement within a cylindrical axial space within a core generally designated by the reference character C. As shown in FIG. 5, the chuck expands radially to engage the cylindrical inner surface I of the core C.

The back plate 11 is generally disc-shaped. The rear face 12 of the back plate 11 is formed with a central projecting disc-shaped boss 13 for reception in a mating recess 14 of the mounting structure M to which the back plate 11 is secured by screws 15 as shown in FIGS. 4 and 5. The front face 16 of the back plate 11 has a generally disc-shaped central recess 17, and the annular perimeter of the front face 16 is also slightly stepped down or recessed as shown at 18 in FIGS. 4 and 5. Radially inward of the recessed edge portion of the back plate there is an annular groove 19 for seating an O-ring seal 20 shown in FIG. 1. The back plate 11 is also shown as housing a central axial through-hole 21 aligned with a passage 22 in the mounting structure M.

Cylinder 23 extends coaxially forward from the back plate edge portions 18 to the rear face 24 of generally disc-shaped face plate 25, which rear face 24 has a stepped or recessed annular peripheral area 26 for receiving the cylinder 23, and an annular groove 27 for seating of another O-ring seal 28 shown in FIG. 1. The face plate 25, cylinder 23 and back plate 11 are tightly secured together by a plurality of screws 29 (preferably six) which extend from the face plate 25, and through the wall of the cylinder 23 and into threaded holes in the back plate 11, all as illustrated in FIGS. 1, 4 and 5, which illustrate only one such screw 29 for simplicity. Additional screws 30, which are shorter than the screws 29, can be provided to secure the face plate 25 to the cylinder 23. The generally disc-shaped piston 31 is mounted, for axial movement, within the cylinder 23 between the back plate 11 and the face plate 25. The perimeter of the piston 31 is shown as having annular grooves 32, 33 receiving lip seals 34, 35 in sliding, sealing contact with the inner wall surface of the cylinder 23.

The space 36 between the rear face 37 of the piston 31 and the front face 16 of the back plate 11 provides a chamber for the admission of air under pressure to advance the piston 31 from the position shown in FIG. 5 to the position shown in FIG. 4. The pressurized air can be admitted to the space 36 through the aligned axial bore holes 21 and 22. Alternatively a valve generally designated by reference numeral 37 can be mounted in a radially extending part in the back plate 1 as shown in FIGS. 1, 4 and 5 for the passage of air under pressure to the chamber 36 via an L-shaped passageway 39 as shown in FIGS. 4 and 5. A seal washer for the valve 37 is also shown in FIG. 1.

A pin 40 slidably fitted in opposed recesses in the front face of piston 31 and the rear face 24 of the face plate 25 prevents relative rotation of the piston 31 with respect to the face plate 25.

A plurality (preferably six) of coiled springs 44 fitted in opposed wells 45 and 46 in the piston 31 and the rear face 24 of the face plate 25 serve to return the piston 31 from the advanced position shown in FIG. 4 to the retracted position of FIG. 5 upon the release of the air under pressure from the chamber 36.

A compression ram, generally designated by reference numeral 47 is mounted on the front face 48 of the piston 31. An integral radially extending flange 49 at the rear end of the generally cylindrical compression ram 47 is received within a recess 50 in the face 48 of the piston 31 and the ram 47 is secured to the piston for movement therewith by a plurality (preferably six) of screws 51, the heads 52 of which extend beyond the rear face 53a of the piston 31. When the piston 31 is in the retracted condition illustrated in FIG. 5 the heads 52 of recess 50 in the face 48 of the piston 31 and the ram 47 is secured to the piston for movement therewith by a plurality (preferably six) of screws 51, the heads 52 of which extend beyond the rear face 53a of the piston 31. When the piston 31 is in the retracted condition illustrated in FIG. 5 the heads 52 of the screws 51 abut against the front face of the back plate at the recessed central area 17, thus limiting the extent of travel of the compression ram 47.

As shown in FIGS. 4 and 5 the ram 47 also has a generally T-shaped passageway 53 for purging air displaced by the advance of the piston 31 toward the face plate 25. If any dust has entered, it will also be exhausted with the expelled air.

The compression ram 47 is slidably received within the central axial opening of a generally tubular ram sleeve 56. The rear end of the ram sleeve 56 is fitted in a circular central opening 57 in the face plate 25 as shown in FIGS. 4 and 5 and a radial flange 58 near the rear end of the sleeve 56 is secured to an annular lip 59 surrounding the opening 57 by a plurality of screws 60. The compression ram 47 is freely movable within the sleeve 56 and through the opening 57. An O-ring seal 61 is preferably fitted around the opening 57, and dowel pins 62 can be fitted between the parts to prevent any relative rotation therebetween.

The structure of the compression ram 47, ram sleeve 56 and the associated parts is shown in detail in the exploded views of FIGS. 2 and 3. As shown in FIG. 2 the generally cylindrical body 63 of the compression ram 47 is formed with three equally arcuately spaced axial channels 64 extending along most of the length of the body 63 with inner ends 65 of channels spaced from the flange 49 on the end of ram 47. The channels 64 are generally rectangular is section, with a widened channel portion formed by a step 66 opening outwardly at the circumference of the near its radially inner end through which a dowel pin 68 passes, and another bore 71 near its outer end for receiving another dowel pin 72 as shown in FIG. 3.

The dowel pins 72 pass through pairs of aligned bore holes 73 in an elongated base jaw member 74 as shown in FIG. 3. The base jaw preferably has rounded ends 75 and longitudinally spaced elongated openings 76 extending therethrough perpendicular to the dowel pins 72. That is, the openings 76 are aligned with the axis of the compression ram 47 and pass through the base jaw 4 in a radial direction. The openings 76 serve to accomodate the outer ends of the lugs 69.

A core jaw member 80 is secured by screws 81 to the outer face of the base jaw 74, which is shown as having a longitudinal channel for holding the core jaw 80.

The tubular ram sleeve 56, which substantially surrounds the body 63 of the compression ram 47, has elongated axially extending openings 84 aligned with the axial channels 64 of the ram 47. The jaw members 74 are movable both axially and radially within the openings 84. Pairs of aligned recesses 85 at opposite sides of the openings 84 accomodate the dowel pins 72 during such movement.

Figure 6:
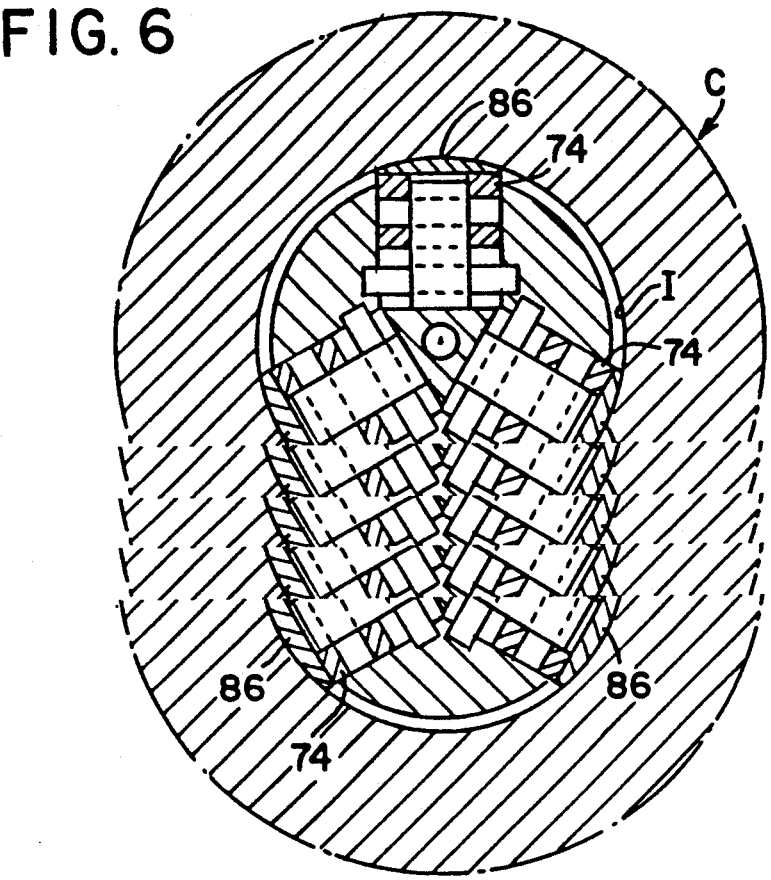
FIG. 6 is a sectional view taken in a plane perpendicular to the chuck axis showing the jaws engaging the interior of a core.
Figure 7:
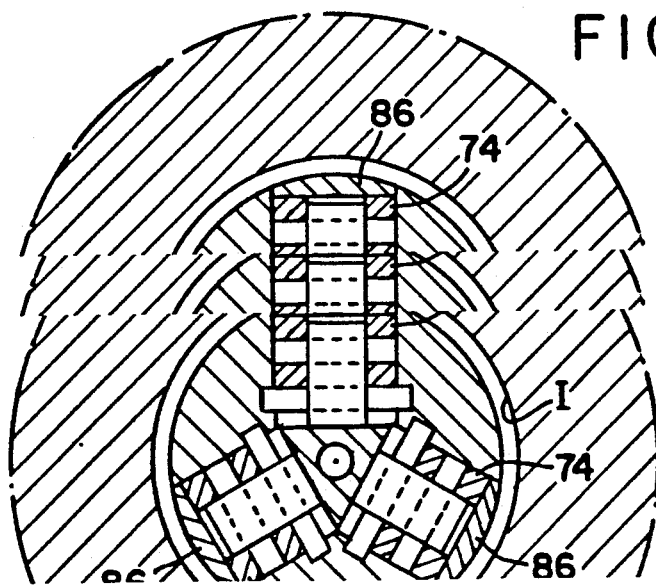
FIG. 7 is a view similar to that of FIG. 6 with the jaws disengaged.

FIGS. 6 and 7 illustrate the radial movement of the jaw members 74 and 80. FIG. 6 shows the curved outer surface 86 engaging the inner surface I of a core C, the curvature of which is approximated by the surface 86. FIG. 7 shows the chuck of the invention in its disengaged condition, wherein the surface 86 of the core jaw 80 is not in contact with the inner wall I of the axial opening through the core C.

The core chuck of the invention is operated as follows. The compression ram body 63, surrounded by the forward end of the sleeve 56, with the jaw members 74, 80 in the retracted position shown in FIG. 5, is moved into the axial opening of a core C. the core jaw 80 is not in contact with the inner wall I of the axial opening through the core C.

The core chuck of the invention is operated as follows. The compression ram body 63, surrounded by the forward end of the sleeve 56, with the jaw members 74, 80 in the retracted position shown in FIG. 5, is moved into the axial opening of a core C. Air under pressure is fed to the chamber 36 through the valve 37 or through the passages 21, 22, pushing the piston 31 forward to the position illustrated in FIG. 4. The piston 31 transmits its forward motion to the compression ram 47, which moves relative to the ram sleeve 56, causing the jaws 74 to swing radially outward, bringing the surfaces 86 of the core jaws 80 into engagement with the inner surface I of the interior opening through the core C, whereby the core C is firmly gripped by the radial force exerted by the expansion of the jaws.

Release of the pressurized air from the chamber 36 causes the springs 44 to push the piston 31 back to the condition shown in FIG. 5, disengaging the chuck from the core.

While a presently preferred embodiment of the invention has been described in detail, those acquainted with the pertinent art will understand that various modifications, substitutions and applications not set forth in the foregoing description may be made without departing from the spirit and scope of the invention. For example, the chuck could be hydraulically actuated. The number of links for each jaw could be different from the three links shown, or a different number of jaws could be employed.

What is claimed is:

1. A fluid actuated core chuck comprising a generally cylindrical compression ram mounted on a piston for linear movement; a sleeve surrounding a forward end of said ram and a plurality of elongated jaw members pivotally connected to the compression ram and movable radially outwardly with respect to the axis of said compression ram upon forward movement of said ram whereby surfaces of the jaw members engage the inner surface of an opening through a core.

2. The core chuck of claim 1 wherein the jaws are pivotally connected to the compression ram by one or more links.

3. The core chuck of claim 1 wherein said jaws are movably positioned in openings through the sleeve.

4. The core chuck of claim 1 wherein the piston is slidably mounted in a cylinder between a back plate and a face plate.

5. The core chuck of claim 4 and including spring means between the face plate and the piston for retraction of the piston.

6. A fluid actuated core chuck having a plurality of jaw members mounted for radially outward movement to engage the inner surface of an opening through a core, each of the jaw members being pivotally mounted by means of one or more links on a generally cylindrical ram movable with respect to a generally tubular sleeve which sleeve has openings accomodating movement of the jaw members and which sleeve surrounds a forward portion of the ram, a rearward portion of the ram being affixed to a piston which is slidably movable within a cylinder.

7. The core chuck of claim 6 wherein three jaw members are arranged at equally arcuately spaced locations around the ram.

8. The core chuck of claim 6 and including springs for retraction of the piston upon relief of pneumatic pressure.

9. The core chuck of claim 6 wherein the ram has an integral radial flange secured to a front face of the piston.

10. The core chuck of claim 6 wherein the ram has axially extending channels for receiving the jaw members and the openings in the sleeve are aligned with the axially extending channels.

11. The core chuck of claim 6 wherein each of the jaw members is pivotally connected to the ram by three links which are pivotable about pins.

* * * * *